US011662150B2

(12) United States Patent
Martinez et al.

(10) Patent No.: US 11,662,150 B2
(45) Date of Patent: May 30, 2023

(54) HEAT EXCHANGER HAVING CURVED FLUID PASSAGES FOR A GAS TURBINE ENGINE

(71) Applicant: General Electric Company, Schenectady, NY (US)

(72) Inventors: Ramon Martinez, Fairfield, OH (US); Raymond Floyd Martell, Wyoming, OH (US); Donald Lee Gardner, West Chester, OH (US)

(73) Assignee: General Electric Company, Schenectady, NY (US)

( * ) Notice: Subject to any disclaimer, the term of this patent is extended or adjusted under 35 U.S.C. 154(b) by 418 days.

(21) Appl. No.: 16/992,474

(22) Filed: Aug. 13, 2020

(65) Prior Publication Data

US 2022/0049904 A1    Feb. 17, 2022

(51) Int. Cl.
*F28D 7/00* (2006.01)
*F28F 9/02* (2006.01)

(52) U.S. Cl.
CPC .......... *F28D 7/0016* (2013.01); *F28F 9/0243* (2013.01); *F28F 2009/029* (2013.01); *F28F 2009/0287* (2013.01); *F28F 2210/10* (2013.01)

(58) Field of Classification Search
CPC .............. F28D 7/0016; F28F 2009/029; F28F 2009/0287; F28F 9/0243
See application file for complete search history.

(56) References Cited

U.S. PATENT DOCUMENTS

| 4,256,172 A | 3/1981 | Rahnke et al. |
| 4,271,110 A * | 6/1981 | Minjolle ................. F28F 21/04 264/209.1 |
| 4,343,355 A * | 8/1982 | Goloff ................... F28D 9/0025 165/DIG. 399 |
| 5,775,412 A | 7/1998 | Montestruc, III et al. |
| 5,980,838 A | 11/1999 | von Hippel et al. |
| 6,460,598 B1 | 10/2002 | Adams et al. |
| 6,668,912 B2 | 12/2003 | Adams et al. |
| 7,285,153 B2 | 10/2007 | Bruun et al. |
| 7,761,990 B2 | 7/2010 | Ellis et al. |

(Continued)

FOREIGN PATENT DOCUMENTS

| DE | 966473 C | 9/1957 |
| DE | 19653989 A1 | 6/1998 |

(Continued)

*Primary Examiner* — Devon Russell
(74) *Attorney, Agent, or Firm* — Dinsmore & Shohl LLP

(57) ABSTRACT

A heat exchanger for a gas turbine engine includes a heat exchanger body having a first surface and a second surface oriented at least partially at an oblique angle relative to the first surface. The heat exchanger body defines a plenum extending between the first and second surfaces. Furthermore, the heat exchanger body defines a fluid passage extending through the second surface such that the fluid passage is in fluid communication with the plenum. The fluid passage, in turn, includes first and second portions. The first portion intersects the plenum at an intersection and defines a line of projection extending normal to the second surface. The second portion defines a line of projection extending normal to the first surface. The fluid passage further includes a curved portion extending from the first portion to the second portion.

20 Claims, 5 Drawing Sheets

(56) References Cited

U.S. PATENT DOCUMENTS

| | | |
|---|---|---|
| 8,051,902 B2 | 11/2011 | Kappes et al. |
| 8,240,365 B2 | 8/2012 | Obana et al. |
| 8,405,659 B2 | 3/2013 | Lakshmanan et al. |
| 9,545,782 B2 | 1/2017 | Shome et al. |
| 9,599,461 B2 | 3/2017 | Gerlach et al. |
| 9,744,719 B2 | 8/2017 | Shome et al. |
| 9,858,728 B2 | 1/2018 | Schmidt |
| 9,902,024 B2 | 2/2018 | Ernst et al. |
| 10,213,964 B2 | 2/2019 | Safai et al. |
| 2003/0089491 A1* | 5/2003 | Mitsumoto ........... F28D 7/1615 165/157 |
| 2004/0131512 A1 | 7/2004 | Abe et al. |
| 2004/0261379 A1 | 12/2004 | Bruun et al. |
| 2011/0011569 A1* | 1/2011 | Baker ................... F28D 7/0016 165/165 |
| 2011/0268583 A1 | 11/2011 | Bunker |
| 2013/0206374 A1 | 8/2013 | Roisin et al. |
| 2013/0306288 A1 | 11/2013 | Taras et al. |
| 2014/0140829 A1 | 5/2014 | Blair et al. |
| 2016/0131443 A1 | 5/2016 | Oliva et al. |
| 2017/0198976 A1* | 7/2017 | Turney ....................... F28F 7/02 |
| 2017/0198977 A1 | 7/2017 | Herring et al. |
| 2017/0198979 A1 | 7/2017 | St. Rock et al. |
| 2017/0205146 A1* | 7/2017 | Turney .................. F28D 7/0033 |
| 2018/0038654 A1* | 2/2018 | Popp ..................... F28D 7/1684 |
| 2018/0186475 A1 | 7/2018 | Garville |
| 2019/0154345 A1* | 5/2019 | Martinez ............... F28D 7/0033 |
| 2019/0309733 A1 | 10/2019 | Grishauge et al. |

FOREIGN PATENT DOCUMENTS

| | | | |
|---|---|---|---|
| GB | 2501413 A | | 10/2013 |
| JP | 2006-064246 A | | 3/2006 |
| WO | WO-8102060 A1 | * | 7/1981 |
| WO | WO2016/0574463 A1 | | 4/2016 |

* cited by examiner

HEAT EXCHANGER HAVING CURVED FLUID PASSAGES FOR A GAS TURBINE ENGINE

FIELD

The present subject matter relates to gas turbine engines and, more particularly, to heat exchanger having curved fluid passages for a gas turbine engine.

BACKGROUND

A turbofan engine generally includes a fan, a compressor section, a combustion section, and a turbine section. More specifically, the fan generates a flow of pressurized air. A portion of this air flow is used as propulsive thrust for propelling an aircraft, while the remaining air is supplied to the compressor section. The compressor section, in turn, progressively increases the pressure of received air and supplies this compressed air to the combustion section. The compressed air and a fuel mix within the combustion section and burn within a combustion chamber to generate high-pressure and high-temperature combustion gases. The combustion gases flow through the turbine section before exiting the engine. In this respect, the turbine section converts energy from the combustion gases into rotational energy. This rotational energy, in turn, is used to drive the compressor section and/or the fan via various shaft and/or gearboxes.

Typically, a turbofan engine includes various heat exchangers to heat or cool the fluids that support the operation of the engine. For example, the engine may include one or more heat exchangers that cool the oil circulated through the gearbox(es) of the engine. While conventional heat exchangers generally provide sufficient heating/cooling to the fluids of the engine, such heat exchangers increase the overall weight of the engine.

Accordingly, an improved heat exchanger for a gas turbine engine would be welcomed in the technology. In particular, a heat exchanger for a gas turbine engine having a reduced weight would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a heat exchanger for a gas turbine engine. The heat exchanger includes a heat exchanger body having a first surface and a second surface oriented at least partially at an oblique angle relative to the first surface. The heat exchanger body defines a plenum extending between the first and second surfaces. Furthermore, the heat exchanger body defines a fluid passage extending through the second surface such that the fluid passage is in fluid communication with the plenum. The fluid passage, in turn, includes first and second portions. The first portion intersects the plenum at an intersection and defines a line of projection extending normal to the second surface. The second portion defines a line of projection extending normal to the first surface. The fluid passage further includes a curved portion extending from the first portion to the second portion.

In another aspect, the present subject matter is directed to a gas turbine engine. The gas turbine engine includes a compressor, a combustor, a turbine, and a heat exchanger in operative association with at least one of the compressor, the combustor, or the turbine. The heat exchanger, in turn, includes a heat exchanger body having a first surface and a second surface oriented at least partially at an oblique angle relative to the first surface. The heat exchanger body defines a plenum extending between the first and second surfaces. Furthermore, the heat exchanger body defines a fluid passage extending through the second surface such that the fluid passage is in fluid communication with the plenum. The fluid passage, in turn, includes first and second portions. The first portion intersects the plenum at an intersection and defines a line of projection extending normal to the second surface. The second portion defines a line of projection extending normal to the first surface. The fluid passage further includes a curved portion extending from the first portion to the second portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
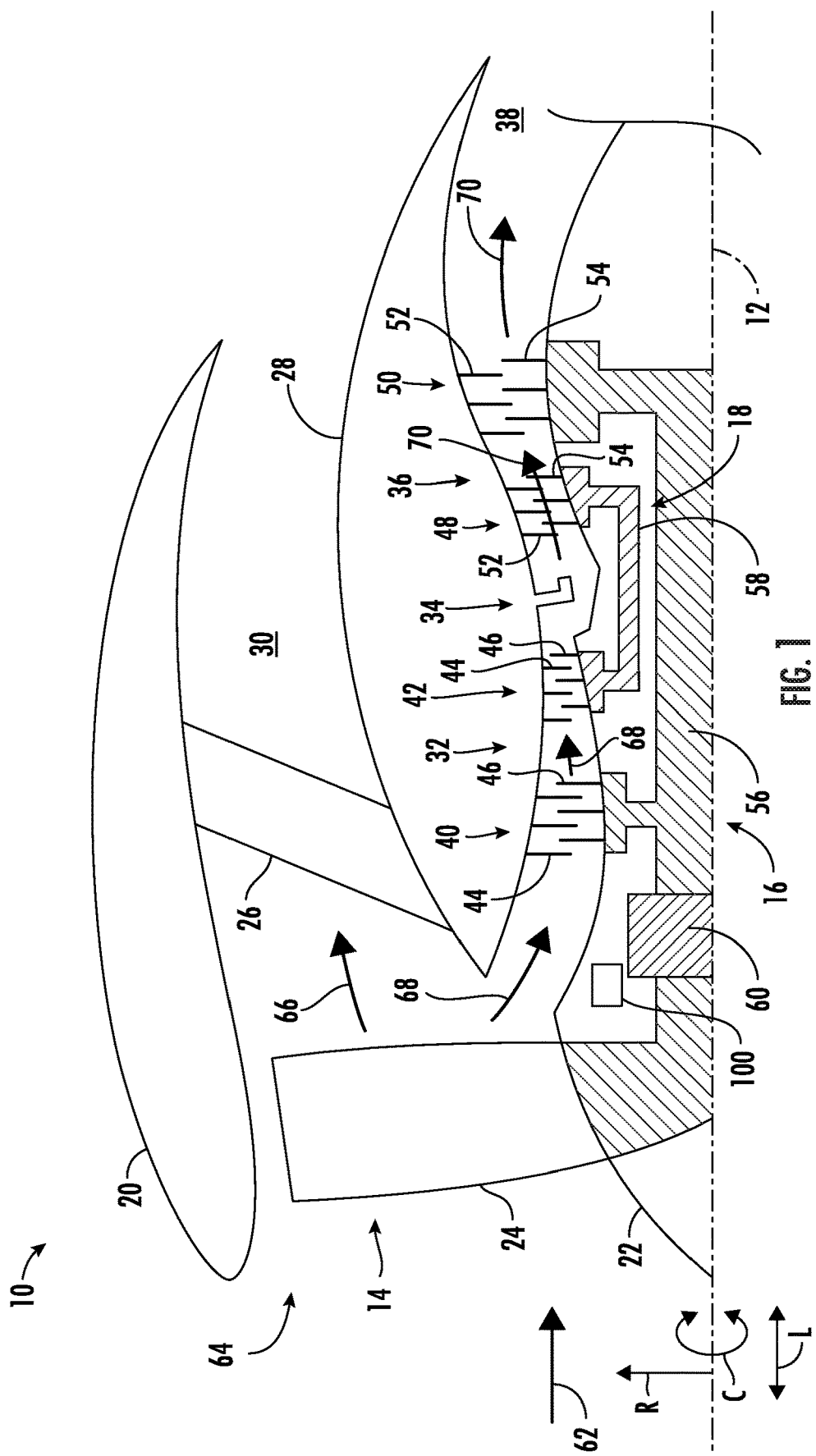
FIG. 1 is a schematic cross-sectional view of one embodiment of a gas turbine engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a heat exchanger suitable for use with a gas turbine engine. In several embodiments, the heat exchanger includes a heat exchanger body defining a plenum therein. The plenum, in turn, extends between first and second surfaces of the heat exchanger body, with the second surface oriented at least partially at an oblique angle relative to the first surface. Furthermore, the heat exchanger body further defines a plurality of fluid passages extending through the second surface such that the fluid passages are fluid communication with the plenum. Each fluid passage, in turn, includes first and second portions. Specifically, the first portion of each fluid passage intersects the plenum at an intersection and defines a line of projection (e.g., a centerline) extending normal to the second surface of the heat exchanger body. Moreover, the second portion of each fluid passage define a line of projection (e.g., a centerline) extending normal to the first surface. Additionally, each fluid passage further includes a curved portion extending from the corresponding first portion to the corresponding second portion.

Positioning the first portion of each fluid passage such that its line of projection extends normal to the second surface (i.e., the surface through which the passages extend to intersect the plenum) of the heat exchanger reduces the weight of the heater exchanger. More specifically, such a configuration reduces the stress concentrations present at the intersections of the fluid passages and the plenum during operation of the heat exchanger. This, in turn, allows the heat exchanger to be formed from lighter materials than conventional heat exchangers (e.g., aluminum instead of steel), while still maintaining the same size envelope and operating under the same fluid pressures.

Referring now to the drawings, FIG. 1 is a schematic cross-sectional view of one embodiment of a gas turbine engine 10. In the illustrated embodiment, the engine 10 is configured as a high-bypass turbofan engine. However, in alternative embodiments, the engine 10 may be configured as a propfan engine, a turbojet engine, a turboprop engine, a turboshaft gas turbine engine, or any other suitable type of gas turbine engine. Furthermore, as shown in FIG. 1, the engine 10 defines a longitudinal direction L, a radial direction R, and a circumferential direction C. In general, the longitudinal direction L extends parallel to an axial centerline 12 of the engine 10, the radial direction R extends orthogonally outward from the axial centerline 12, and the circumferential direction C extends generally concentrically around the axial centerline 12.

In general, the engine 10 includes a fan 14, a low-pressure (LP) spool 16, and a high pressure (HP) spool 18 at least partially encased by an annular nacelle 20. More specifically, the fan 14 may include a fan rotor 22 and a plurality of fan blades 24 (one is shown) coupled to the fan rotor 22. In this respect, the fan blades 24 are spaced apart from each other along the circumferential direction C and extend outward from the fan rotor 22 along the radial direction R. Moreover, the LP and HP spools 16, 18 are positioned downstream from the fan 14 along the axial centerline 12 (i.e., in the longitudinal direction L). As shown, the LP spool 16 is rotatably coupled to the fan rotor 22, thereby permitting the LP spool 16 to rotate the fan 14. Additionally, a plurality of outlet guide vanes or struts 26 spaced apart from each other in the circumferential direction C extend between an outer casing 28 surrounding the LP and HP spools 16, 18 and the nacelle 20 along the radial direction R. As such, the struts 26 support the nacelle 20 relative to the outer casing 28 such that the outer casing 28 and the nacelle 20 define a bypass airflow passage 30 positioned therebetween.

The outer casing 28 generally surrounds or encases, in serial flow order, a compressor section 32, a combustion section 34, a turbine section 36, and an exhaust section 38. For example, in some embodiments, the compressor section 32 may include a low-pressure (LP) compressor 40 of the LP spool 16 and a high-pressure (HP) compressor 42 of the HP spool 18 positioned downstream from the LP compressor 40 along the axial centerline 12. Each compressor 40, 42 may, in turn, include one or more rows of stator vanes 44 interdigitated with one or more rows of compressor rotor blades 46. Moreover, in some embodiments, the turbine section 36 includes a high-pressure (HP) turbine 48 of the HP spool 18 and a low-pressure (LP) turbine 50 of the LP spool 16 positioned downstream from the HP turbine 48 along the axial centerline 12. Each turbine 48, 50 may, in turn, include one or more rows of stator vanes 52 interdigitated with one or more rows of turbine rotor blades 54.

Additionally, the LP spool 16 includes the low-pressure (LP) shaft 56 and the HP spool 18 includes a high pressure (HP) shaft 58 positioned concentrically around the LP shaft 56. In such embodiments, the HP shaft 56 rotatably couples the rotor blades 54 of the HP turbine 48 and the rotor blades 46 of the HP compressor 42 such that rotation of the HP turbine rotor blades 54 rotatably drives HP compressor rotor blades 46. As shown, the LP shaft 56 is directly coupled to the rotor blades 54 of the LP turbine 50 and the rotor blades 46 of the LP compressor 40. Furthermore, the LP shaft 56 is coupled to the fan 14 via a gearbox 60. In this respect, the rotation of the LP turbine rotor blades 54 rotatably drives the LP compressor rotor blades 46 and the fan blades 24.

In several embodiments, the engine 10 may generate thrust to propel an aircraft. More specifically, during operation, air (indicated by arrow 62) enters an inlet portion 64 of the engine 10. The fan 14 supplies a first portion (indicated by arrow 66) of the air 62 to the bypass airflow passage 30 and a second portion (indicated by arrow 68) of the air 62 to the compressor section 32. The second portion 68 of the air 62 first flows through the LP compressor 40 in which the rotor blades 46 therein progressively compress the second portion 68 of the air 62. Next, the second portion 68 of the air 62 flows through the HP compressor 42 in which the rotor blades 46 therein continue progressively compressing the second portion 68 of the air 62. The compressed second portion 68 of the air 62 is subsequently delivered to the combustion section 34. In the combustion section 34, the second portion 68 of the air 62 mixes with fuel and burns to generate high-temperature and high-pressure combustion gases 70. Thereafter, the combustion gases 70 flow through the HP turbine 48 which the HP turbine rotor blades 54 extract a first portion of kinetic and/or thermal energy therefrom. This energy extraction rotates the HP shaft 58, thereby driving the HP compressor 42. The combustion gases 70 then flow through the LP turbine 50 in which the LP turbine rotor blades 54 extract a second portion of kinetic and/or thermal energy therefrom. This energy extraction rotates the LP shaft 56, thereby driving the LP compressor 40 and the fan 14 via the gearbox 60. The combustion gases 70 then exit the engine 10 through the exhaust section 38.

Additionally, the engine 10 may include one or more heat exchangers 100. In general, the heat exchanger(s) 100 heat and/or cool one or more fluids (e.g., oil, fuel, and/or the like) that support the operation of the engine 10. Specifically, in several embodiments, the heat exchanger(s) 100 may be in operative association with one or more components of the engine 10, such as the fan 14, the compressor section 32, the combustion section 34, and/or the turbine section 36. For example, in the illustrated embodiment, the engine 10 includes a heat exchanger 100 in operative association with the gearbox 60. In such an embodiment, the heat exchanger 100 may be configured as a fuel-oil heat exchanger that transfers heat from the oil circulating the gearbox 60 to the fuel supplied to the combustion section 34. However, in alternative embodiments, the heat exchanger(s) 100 may be in operative association with any other suitable component(s) of the engine 10. Moreover, in further embodiments, the engine 10 may include any other suitable number or type of heat exchanger 100.

The configuration of the gas turbine engine 10 described above and shown in FIG. 1 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 2:
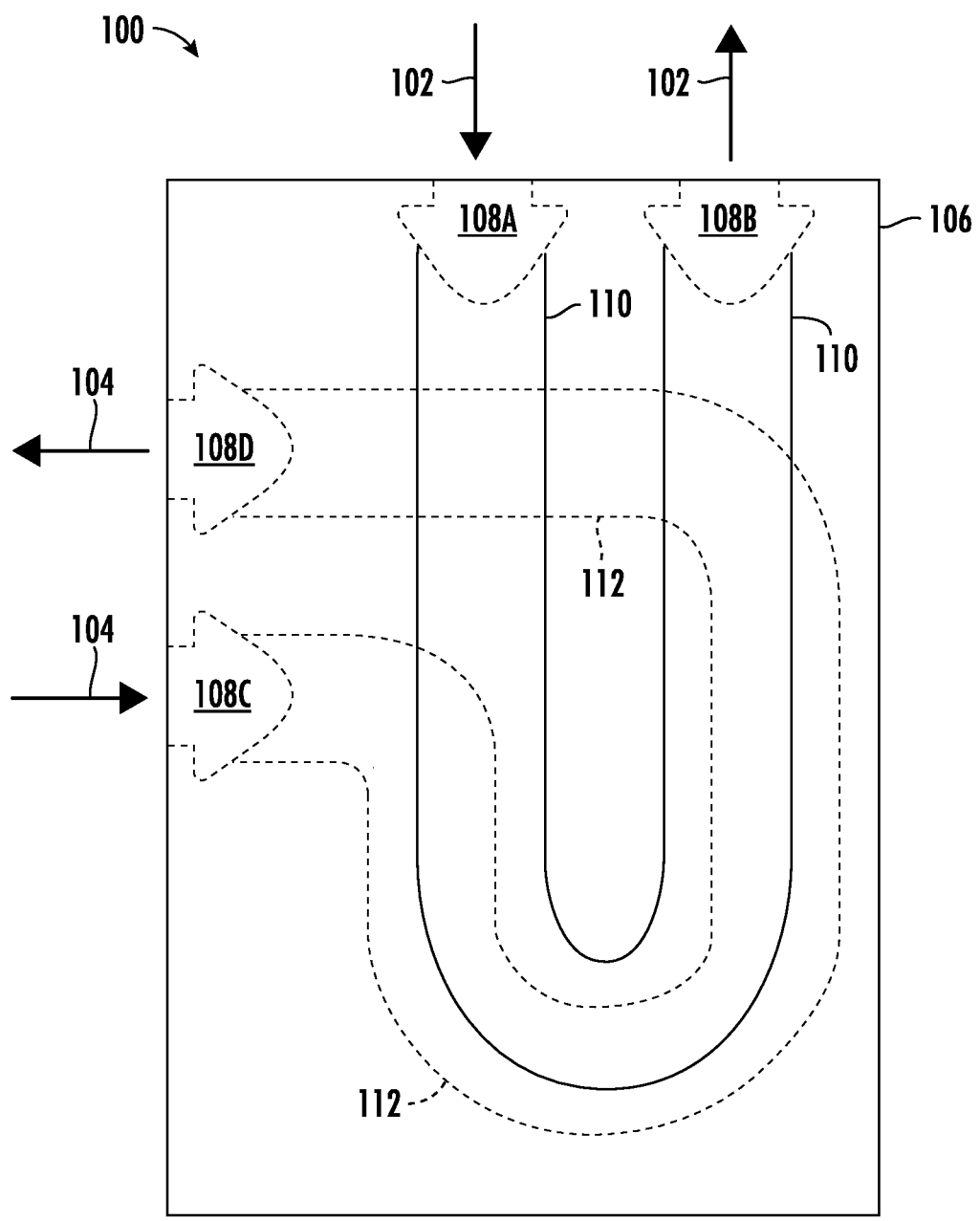
FIG. 2 is a schematic view of one embodiment of a heat exchanger suitable for use with a gas turbine engine.

FIG. 2 is a schematic view of one embodiment of a heat exchanger 100 suitable for use with a gas turbine engine. In general, the heat exchanger 100 is configured to transfer heat between a first fluid (indicated by arrows 102) and second fluid (indicated by arrows 104). For example, as mentioned above, in one embodiment, the heat exchanger 100 may be configured to transfer heat between oil and fuel. However, in alternative embodiments, the heat exchanger 100 may be configured to transfer heat between any other suitable fluids.

The heat exchanger 100 includes a heat exchanger body 106 defining various fluid passages, plena, and openings therein through which the first and second fluid 102, 104 flow. In several embodiments, the body 106 defines a first inlet plenum 108A, a first outlet plenum 108B, and a first plurality of fluid passages (indicated by solid lines 110) extending from the first inlet plenum 108A to the first outlet plenum 108B. In this respect, the first fluid 102 enters the heat exchanger 100 (e.g., via an associated port) and flows into the first inlet plenum 108A. Thereafter, the first fluid 102 flows through the first plurality of fluid passages 110 before flowing into the first outlet plenum 108B and exiting the heat exchanger 100 (e.g., via an associated port). Furthermore, the body 106 defines a second inlet plenum 108C, a second outlet plenum 108D, and a second plurality of fluid passages (indicated by dashed lines 112) extending from the second inlet plenum 108C to the second outlet plenum 108D. As such, the second fluid 104 enters the heat exchanger 100 (e.g., via an associated access port) and flows into the second inlet plenum 108C. Thereafter, the second fluid 104 flows through the second plurality of fluid passages 112 before flowing into the second outlet plenum 108D and exiting the heat exchanger 100 (e.g., via an associated access port). As shown, portions of the first plurality of fluid passages 110 are routed through the body 106 in close proximity to portions of the second plurality of fluid passages 112, thereby permitting heat transfer between the first and second fluids.

As shown in FIG. 2, the first and second pluralities of fluid passages 110, 112 each include two fluid passages. However, the first and second pluralities of fluid passages 110, 112 may each include any other suitable number of fluid passages, such a twenty, fifty, or one hundred fluid passages.

Figure 3:
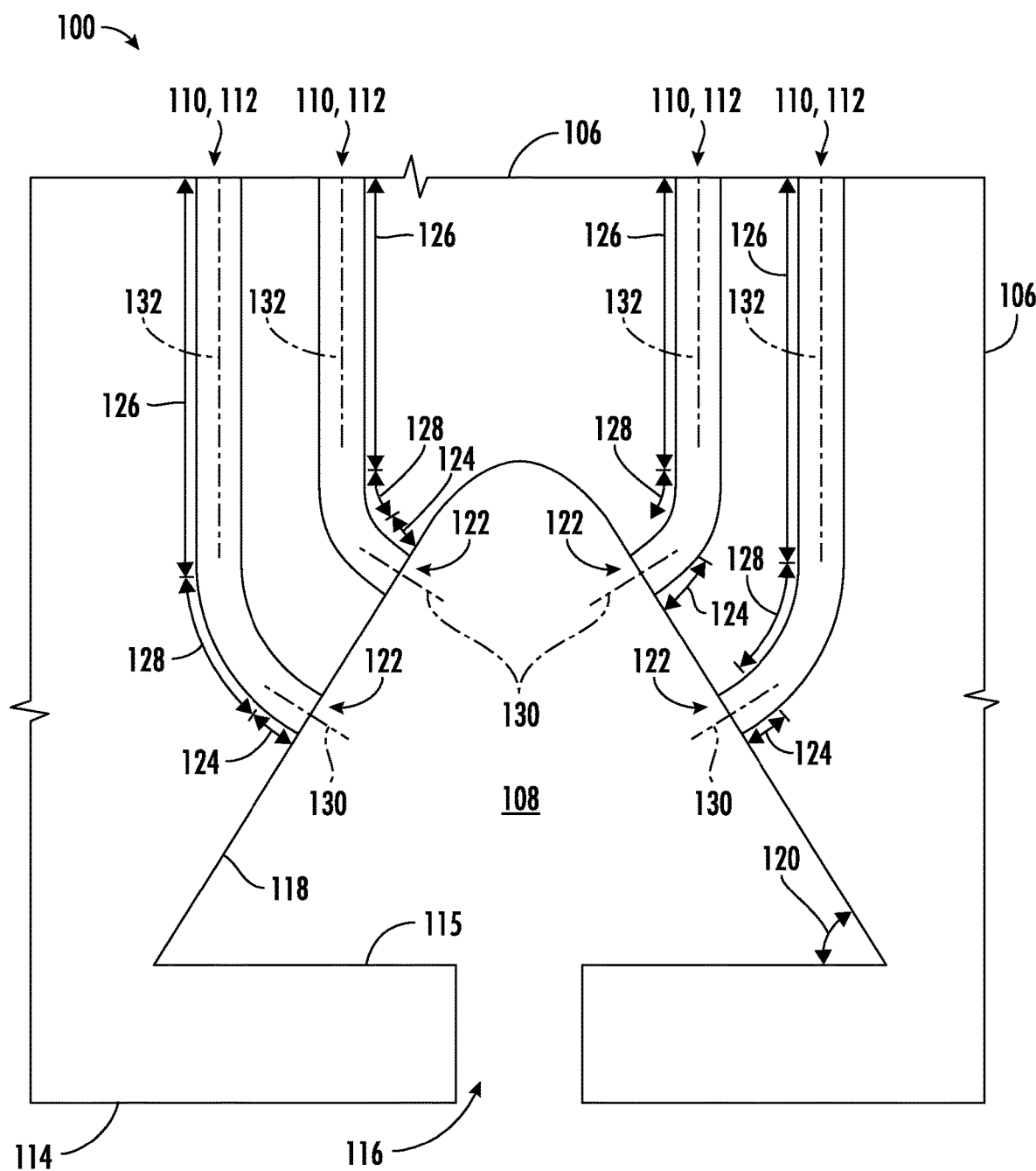
FIG. 3 is a partial cross-sectional view of one embodiment of a heat exchanger suitable for use with a gas turbine engine, particularly illustrating various portions of a plurality of fluid passages defined by a body of the heat exchanger.
Figure 5:
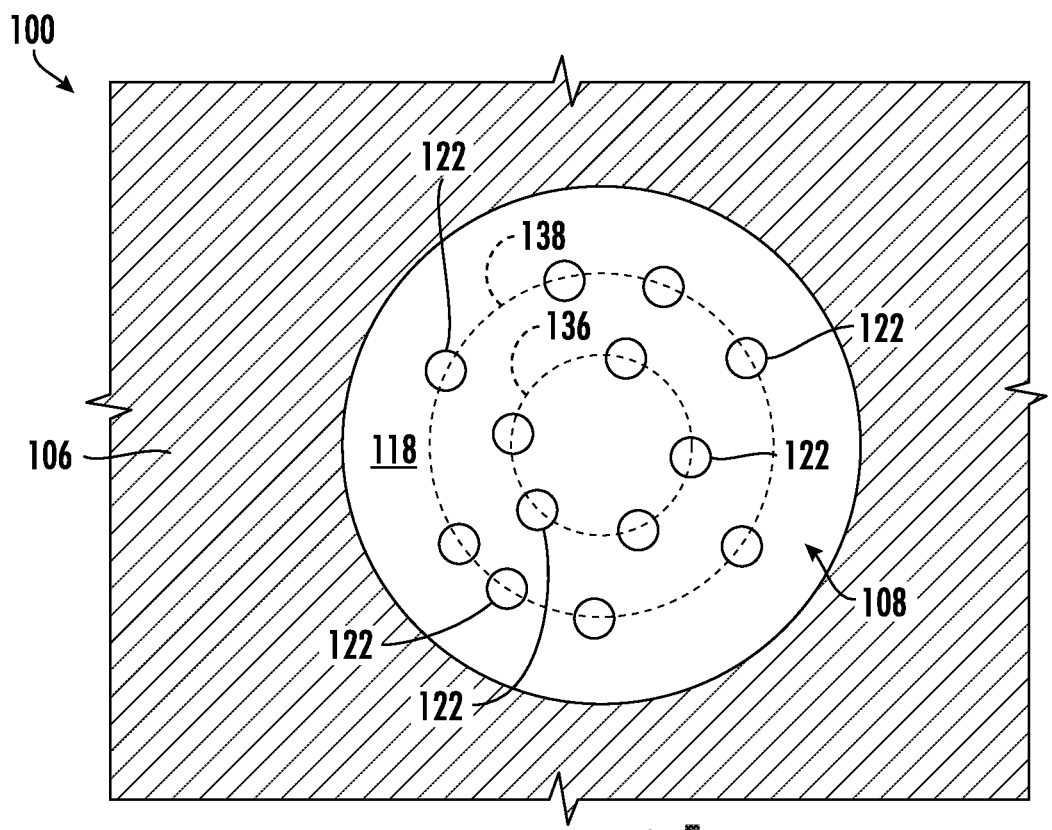
FIG. 5 is another partial cross-sectional view of one embodiment of a heat exchanger suitable for use with a gas turbine engine, particularly illustrating a plenum defined by a heat exchanger body.

FIG. 3 is partial, cross-sectional view of the heat exchanger 100. In several embodiments, the heat exchanger body 106 defines a plenum 108 and an access port 116 in fluid communication with the plenum 108. Specifically, in the embodiment shown in FIG. 3, the access port 116 extends from an exterior surface 114 of the body 106 to a first interior surface 115 of the body 106. For example, as shown in FIG. 5, in some embodiments, the access port 116 has a non-polygonal shape, such a circle, ellipse, oval, filleted/rounded-off rectangle, and or the like. However, in alternative embodiments, the access port 116 may have any other suitable shape. Moreover, the the plenum 108 may correspond to any of the plena 108A, 108B, 108C, 108D shown in FIG. 2. The plenum 108 extends inward (i.e., relative to the exterior surface 114 of the body 106) from the first interior surface 115 to a second interior surface 118 of the heat exchanger body 106. As shown, the second interior surface 118 is oriented at least partially at an oblique angle (indicated by arrow 120) relative to the first interior surface 115. In this respect, the plenum 108 corresponds three-dimensional cavity or space positioned inward of the exterior surface 114 of the body 106. For example, in one embodiment, the plenum 108 may have a conical shape. Moreover, in the illustrated embodiment, the plenum 108 has a closed configuration (i.e., the plenum 108 is defined between two interior surface of the heat exchanger body 106). However, in alternative embodiments, the plenum 108 may have any other suitable shape, such as a spherical shape. Furthermore, the plenum 108 may have an open configuration. In such a configuration, the plenum 108 extends from an opening defined by the exterior surface 114 to the interior surface 118, with the interior surface 118 intersecting and being oblique to the exterior surface 114.

Additionally, as mentioned above, the heat exchanger body 106 defines the first and second pluralities of fluid passages 110, 112. As shown, several fluid passages 110, 112 extend through the interior surface 118 and intersect the plenum 108 at a corresponding intersection 122. In this respect, the fluid passages 110, 112 are in fluid communication with the plenum 108 via the corresponding intersections 122. As such, fluid is able to flow from the plenum 108 into the fluid passages 110, 112 or from the fluid passages 110, 112 into the plenum 108. Although FIG. 3 shows four fluid passages 110, 112 intersecting the plenum 108, any suitable number (e.g., twenty, fifty, or more) of fluid passages 110, 112 may intersect the plenum 108.

As shown, each fluid passage 110, 112 includes a first portion (indicated by arrows 124), a second portion (indicated by arrows 126), and a curved portion (indicated by arrows 128). In several embodiments, the first portion 124 of each fluid passage 110, 112 is positioned proximal to the plenum 108 such that the first portion 124 extends through the interior surface 118 and intersects the plenum 108 at the corresponding intersection 122. Furthermore, the first portion 124 of each fluid passage 110, 112 defines a line of projection 130 that extends normal or perpendicular to the interior surface 118 of the heat exchanger body 106. Specifically, the line of projection 130 of the first portion 124 of each fluid passage 110, 112 is normal to the section of the interior surface 118 through which the corresponding first portion 124 extends. As will be described below, such an orientation of the first portion 124 of each fluid passage 110, 112 reduces the stress concentrations present at the intersections 122. The second portion 126 of each fluid passage 110, 112 is distal to the plenum 108 and defines a line of projection 132 extending normal or perpendicular to the interior surface 115 or the exterior surface 114 of the body 106. Moreover, the curved portion 128 of each fluid passage 110, 112 extends from and fluidly couples the corresponding first portion 124 to the corresponding portion 126. Thus, each curved portion 128 provides a transition between the corresponding first and second portions 124, which have differing orientations. Additionally, in some embodiments, the first, second, and curved portions of the fluid passages 110, 112 have the same diameter and cross-sectional shape.

In the illustrated embodiment, the lines of projections 130, 132 correspond to the centerlines of the first and second portions 124, 126 of the fluid passages 110, 112. However, in alternative embodiments, the lines of projections 130, 132 may correspond to any other suitable lines defined by the first and second portions 124, 126 of the fluid passages 110, 112.

Figure 4:
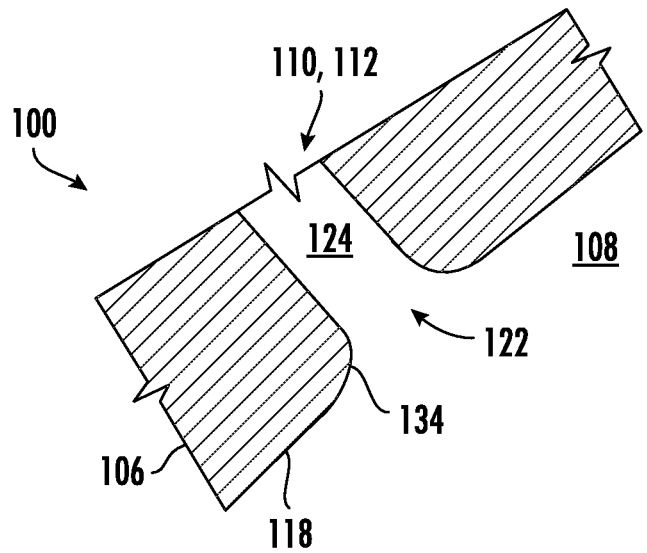
FIG. 4 is a partial cross-sectional view of one embodiment of a heat exchanger suitable for use with a gas turbine engine, particularly illustrating an intersection between a fluid passage defined by a heat exchanger body and a plenum defined by the body.

Referring now to FIG. 4, the heat exchanger body 106 may define one or more stress-reducing features 134. More specifically, as described above, the first portion 124 of one of the fluid passages 110, 112 extends through the interior surface 118 and intersects the plenum 108 at each intersection 122. In this respect, the heat exchanger body 106 may define a stress-reducing feature 134 at each intersection 122. The stress-reducing features 134, in turn, distribute stress over a larger area, thereby reducing the stress concentrations present at the intersections 122 during operation of the heat exchanger 100. As will be described below, positioning the first portions 124 of the fluid passages 110, 112 such that their lines of projection 130 are normal to the interior surface 118 permits the formation of the stress-reducing features 134 at the intersections 122.

The stress-reducing feature(s) 134 may correspond to any suitable feature(s) defined by the heat exchanger body 106 located at the intersections 122 that distributes stress over a larger area. For example, in the illustrated embodiment, the stress-reducing features 134 are configured as fillets. However, in other embodiments, the stress-reducing feature(s) 134 may be configured as other rounded edges, chamfers or other beveled edges, and/or the like.

FIG. 5 is a partial cross-sectional of view of the heat exchanger 100. As mentioned above, the fluid passages 110, 112 intersect the plenum 108 at the intersections 122. In several embodiments, the intersections 122 are arranged non-uniformly or staggered along the interior surface 118 defining the plenum 108. Specifically, in some embodiments, the intersections 122 may be arranged in concentric rings along the interior surface 118. For example, in the illustrated embodiment, the intersections 122 corresponding to a first set of the fluid passages 110, 112 are arranged in a first ring (indicated by dashed line 136) along the interior surface 118. Moreover, in the illustrated embodiment, the intersections 122 corresponding to a second set of the fluid passages 110, 112 are arranged in a second ring (indicated by dashed line 138) along the interior surface 118. The second ring 138 may, in turn, enclose and/or be concentric with the first ring 136. However, in alternative embodiments, the intersections 122 may be arranged in any other suitable manner along the interior surface 118 defining the plenum 108.

Figure 6:
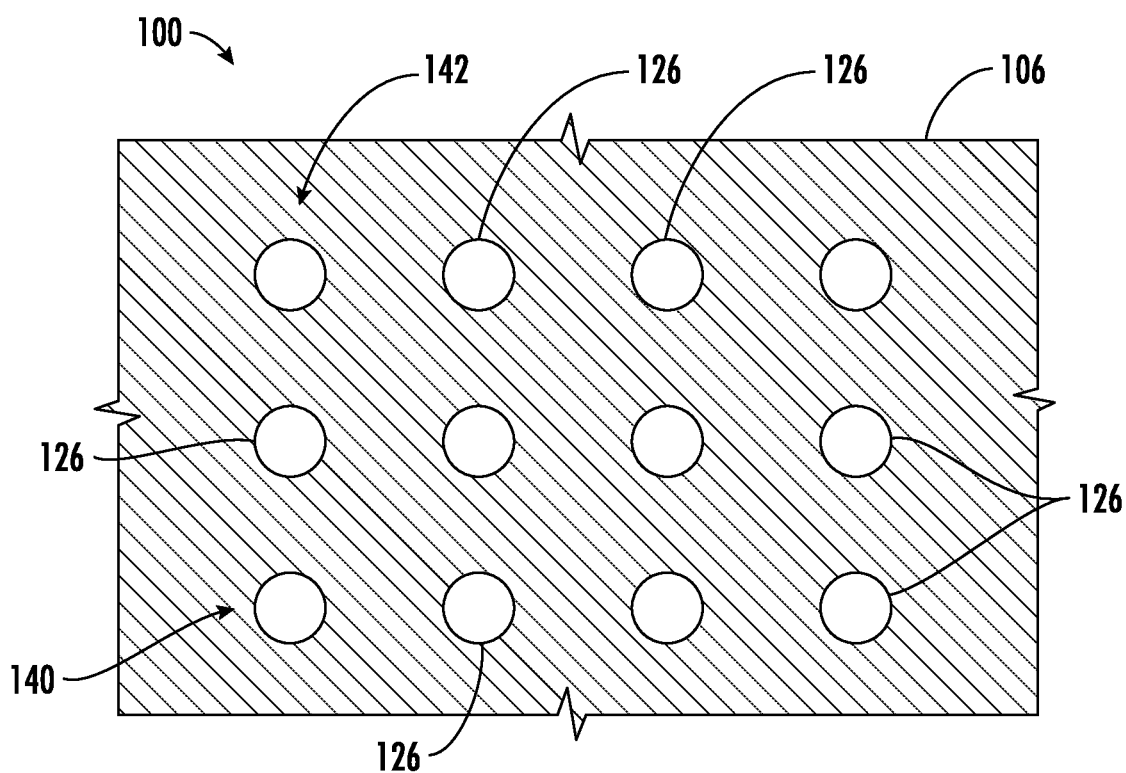
FIG. 6 is a further partial cross-sectional view of one embodiment of a heat exchanger suitable for use with a gas turbine engine, particularly illustrating the relative positioning of first and second pluralities of the fluid passages defined by a heat exchanger body.

FIG. 6 is another partial cross-sectional view of the heat exchanger 100. As mentioned above, each fluid passage 110, 112 includes a second portion 126. As show, the second portions 126 of the fluid passages 110, 112 are arranged into a plurality of rows 140 and a plurality of columns 142. The second portions 126 may be evenly spaced apart from each other within each row 140 and within each column 142. Arranging the second portions 126 of the fluid passages 110, 112 into rows 140 and columns 142 may allow the fluid passages 110 to be routed in close proximity to the fluid passages 112, thereby permitting heat transfer between the first and second fluids. However, in alternative embodiments, the second portions 126 of the fluid passages 110, 112 may be arranged in any other suitable manner.

In several embodiments, the heat exchanger 100 may be monolithic or formed as single integral component. As such, the heat exchanger 100 may be formed using a suitable additive manufacturing method. The term "additive manufacturing" refers to any process resulting in a useful, three-dimensional object and includes a step of sequentially forming the shape of the object one layer at a time. Additive manufacturing processes include three-dimensional printing (3DP) processes, laser-net-shape manufacturing, direct metal laser sintering (DMLS), direct metal laser melting (DMLM), plasma transferred arc, freeform fabrication, and the like. A particular type of additive manufacturing process uses an energy beam (e.g., an electron beam or electromagnetic radiation, such as a laser beam) to sinter or melt a powder material. Additive manufacturing processes typically employ metal powder materials or wire as a raw material.

Positioning of the first portions 124 of the fluid passages 110, 112 such that the lines of projection 130 (e.g., the centerlines) of the first portions 124 are normal to the interior surface 118 defining the plenum 108 through which the passages 110, 112 extend reduces the weight of the heat exchanger 100. Specifically, such positioning of the first portions 124 allows the intersections 122 between the fluid passages 110, 112 and the plenum 108 to be non-uniformly arranged or staggered along the interior surface 118. The positioning of the first portions 124 and the non-uniform positioning of the intersections 122, in turn, reduce the stress concentrations present at the intersections 122 during operation of the heat exchanger 100. Furthermore, the non-uniform positioning allows for the formation of stress-reducing features (e.g., fillets) at the intersections 122, which further reduce the stress concentrations present during operation. As such, the heat exchanger 100 may be formed from lighter materials than conventional heat exchangers (e.g., aluminum instead of steel), while still maintaining the same size envelope and operating under the same fluid pressures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A heat exchanger for a gas turbine engine, the heat exchanger comprising: a heat exchanger body including a first surface and a second surface oriented at least partially at an oblique angle relative to the first surface, the heat exchanger body defining a plenum extending between the first and second surfaces, the heat exchanger body further defining a fluid passage extending through the second surface such that the fluid passage is in fluid communication with the plenum, wherein the fluid passage includes first and second portions, the first portion intersecting the plenum at an intersection and defining a line of projection extending normal to the second surface, the second portion defining a line of projection extending normal to the first surface, the fluid passage further including a curved portion extending from the first portion to the second portion.

The heat exchanger of one or more of these clauses, wherein the heat exchanger body defines a stress-reducing feature at the intersection of the first portion of the fluid passage and the plenum.

The heat exchanger of one or more of these clauses, wherein the heat exchanger body further defines a plurality of the fluid passages extending through the second surface such that the plurality of fluid passages is in fluid communication with the plenum, each fluid passage includes the first and second portions, each first portion intersecting the plenum at a corresponding intersection and defining a line of projection extending normal to the second surface, each second portion defining a line of projection extending normal to the first surface, each fluid passage further including a curved portion extending from the corresponding first portion to the corresponding second portion.

The heat exchanger of one or more of these clauses, wherein the intersections of the first portions of the plurality of the fluid passages and the plenum are non-uniformly arranged along the interior surface.

The heat exchanger of one or more of these clauses, wherein the intersections corresponding to a first set of the plurality of fluid passages are arranged in a first ring along the interior surface and the intersections corresponding to a second set of the plurality of fluid passages are arranged in a second ring along the interior surface, the second ring enclosing the first ring.

The heat exchanger of one or more of these clauses, wherein the second portions of the plurality of fluid passages are uniformly spaced apart within the heat exchanger body.

The heat exchanger of one or more of these clauses, wherein the plurality of fluid passages corresponds to a first plurality of passages through which a first fluid is configured to flow, the heat exchanger body further defining a second plurality of fluid passages through which a second fluid is configured to flow, the second plurality of fluid passages positioned relative to the first plurality of fluid passages such that the second fluid is in thermal communication with the first fluid.

The heat exchanger of one or more of these clauses, wherein the second portions of the first plurality of fluid passages are arranged in a plurality of rows and a plurality of columns.

The heat exchanger of one or more of these clauses, wherein the first portion, the second portion, and the curved portion of the fluid passage have a same diameter and a same cross-sectional shape.

The heat exchanger of one or more of these clauses, wherein the heat exchanger body is monolithic.

The heat exchanger of one or more of these clauses, wherein the plenum is spherical or conical.

A gas turbine engine, comprising: a compressor, a combustor, a turbine, and a heat exchanger in operative association with at least one of the compressor, the combustor, or the turbine, the heat exchanger comprising: a heat exchanger body including a first surface and a second surface oriented at least partially at an oblique angle relative to the first surface, the heat exchanger body defining a plenum extending between the first and second surfaces, the heat exchanger body further defining a fluid passage extending through the second surface such that the fluid passage is in fluid communication with the plenum, wherein the fluid passage includes first and second portions, the first portion intersecting the plenum at an intersection and defining a line of projection extending normal to the second surface, the second portion defining a line of projection extending normal to the first surface, each fluid passage further including a curved portion extending from the first portion to the second portion.

The gas turbine engine of one or more of these clauses, wherein the heat exchanger body defines a stress-reducing feature at the intersection of the first portion of the fluid passage and the plenum.

The gas turbine engine of one or more of these clauses, wherein the heat exchanger body further defines a plurality of the fluid passages extending through the second surface such that the plurality of fluid passages is in fluid communication with the plenum, each fluid passage includes the first and second portions, each first portion intersecting the plenum at a corresponding intersection and defining a line of projection extending normal to the second surface, each second portion defining a line of projection extending normal to the first surface, the fluid passage further including a curved portion extending from the corresponding first portion to the corresponding second portion.

The gas turbine engine of one or more of these clauses, wherein the intersections of the first portions of the plurality of fluid passages and the plenum are non-uniformly arranged along the interior surface.

The gas turbine engine of one or more of these clauses, wherein the intersections corresponding to a first set of the plurality of fluid passages are arranged in a first ring along the interior surface and the intersections corresponding to a second set of the plurality of fluid passages are arranged in a second ring along the interior surface, the second ring enclosing the first ring.

The gas turbine engine of one or more of these clauses, wherein the second portions of the plurality of fluid passages are uniformly spaced apart within the heat exchanger body.

The gas turbine engine of one or more of these clauses, wherein the plurality of fluid passages corresponds to a first plurality of passages through which a first fluid is configured to flow, the heat exchanger body further defining a second plurality of fluid passages through which a second fluid is configured to flow, the second plurality of fluid passages positioned relative to the first plurality of fluid passages such that the second fluid is in thermal communication with the first fluid.

The gas turbine engine of one or more of these clauses, wherein the second portions of the first plurality of fluid passages are arranged in a plurality of rows and a plurality of columns.

The gas turbine engine of one or more of these clauses, wherein the first portion, the second portion, and the curved portion of the fluid passage have a same diameter and a same cross-sectional shape.

What is claimed is:

1. A heat exchanger for a gas turbine engine, the heat exchanger comprising:
   a heat exchanger body including a first surface and a second surface oriented at least partially at an oblique angle relative to the first surface, the heat exchanger body defining a plenum extending between the first and second surfaces, the heat exchanger body further defining a fluid passage extending through the second surface such that the fluid passage is in fluid communication with the plenum,
   wherein the fluid passage includes first and second portions, the first portion intersecting the plenum at an intersection and defining a line of projection extending normal to the second surface, the second portion defining a line of projection extending normal to the first surface, the fluid passage further including a curved portion extending from the first portion to the second portion.

2. The heat exchanger of claim 1, wherein the heat exchanger body defines a stress-reducing feature at the intersection of the first portion of the fluid passage and the plenum.

3. The heat exchanger of claim 1, wherein the heat exchanger body further defines a plurality of fluid passages extending through the second surface such that the plurality of fluid passages is in fluid communication with the plenum, each fluid passage includes the first and second portions, each first portion intersecting the plenum at a corresponding intersection and defining a line of projection extending normal to the second surface, each second portion defining a line of projection extending normal to the first surface, each fluid passage further including a curved portion extending from the corresponding first portion to the corresponding second portion.

4. The heat exchanger of claim 3, wherein the intersections of the first portions of the plurality of the fluid passages and the plenum are non-uniformly arranged along the second surface.

5. The heat exchanger of claim 3, wherein the intersections corresponding to a first set of the plurality of fluid passages are arranged in a first ring along the second surface and the intersections corresponding to a second set of the plurality of fluid passages are arranged in a second ring along the second surface, the second ring enclosing the first ring.

6. The heat exchanger of claim 3, wherein the second portions of the plurality of fluid passages are uniformly spaced apart within the heat exchanger body.

7. The heat exchanger of claim 6, wherein the plurality of fluid passages corresponds to a first plurality of fluid passages through which a first fluid is configured to flow, the heat exchanger body further defining a second plurality of fluid passages through which a second fluid is configured to flow, the second plurality of fluid passages positioned relative to the first plurality of fluid passages such that the second fluid is in thermal communication with the first fluid.

8. The heat exchanger of claim 6, wherein the second portions of the first plurality of fluid passages are arranged in a plurality of rows and a plurality of columns.

9. The heat exchanger of claim 1, wherein the first portion, the second portion, and the curved portion of the fluid passage have a same diameter and a same cross-sectional shape.

10. The heat exchanger of claim 1, wherein the heat exchanger body is monolithic.

11. The heat exchanger of claim 1, wherein the plenum is spherical or conical.

12. A gas turbine engine, comprising:
    a compressor;
    a combustor;
    a turbine;
    a heat exchanger in operative association with at least one of the compressor, the combustor, or the turbine, the heat exchanger comprising:
       a heat exchanger body including a first surface and a second surface oriented at least partially at an oblique angle relative to the first surface, the heat exchanger body defining a plenum extending between the first and second surfaces, the heat exchanger body further defining a fluid passage extending through the second surface such that the fluid passage is in fluid communication with the plenum,
       wherein the fluid passage includes first and second portions, the first portion intersecting the plenum at an intersection and defining a line of projection extending normal to the second surface, the second portion defining a line of projection extending normal to the first surface, each fluid passage further including a curved portion extending from the first portion to the second portion.

13. The gas turbine engine of claim 12, wherein the heat exchanger body defines a stress-reducing feature at the intersection of the first portion of the fluid passage and the plenum.

14. The gas turbine engine of claim 12, wherein the heat exchanger body further defines a plurality of fluid passages extending through the second surface such that the plurality of fluid passages is in fluid communication with the plenum, each fluid passage includes the first and second portions, each first portion intersecting the plenum at a corresponding intersection and defining a line of projection extending normal to the second surface, each second portion defining a line of projection extending normal to the first surface, the fluid passage further including a curved portion extending from the corresponding first portion to the corresponding second portion.

15. The gas turbine engine of claim 14, wherein the intersections of the first portions of the plurality of fluid passages and the plenum are non-uniformly arranged along the second surface.

16. The gas turbine engine of claim 14, wherein the intersections corresponding to a first set of the plurality of fluid passages are arranged in a first ring along the second surface and the intersections corresponding to a second set of the plurality of fluid passages are arranged in a second ring along the second surface, the second ring enclosing the first ring.

17. The gas turbine engine of claim 14, wherein the second portions of the plurality of fluid passages are uniformly spaced apart within the heat exchanger body.

18. The gas turbine engine of claim 17, wherein the plurality of fluid passages corresponds to a first plurality of fluid passages through which a first fluid is configured to flow, the heat exchanger body further defining a second plurality of fluid passages through which a second fluid is configured to flow, the second plurality of fluid passages positioned relative to the first plurality of fluid passages such that the second fluid is in thermal communication with the first fluid.

19. The gas turbine engine of claim 17, wherein the second portions of the first plurality of fluid passages are arranged in a plurality of rows and a plurality of columns.

20. The gas turbine engine of claim 12, wherein the first portion, the second portion, and the curved portion of the fluid passage have a same diameter and a same cross-sectional shape.

* * * * *